(12) United States Patent
Sullivan

(10) Patent No.: US 11,579,747 B1
(45) Date of Patent: Feb. 14, 2023

(54) 3D USER INTERFACE DEPTH FORGIVENESS

(71) Applicant: Snap Inc., Santa Monica, CA (US)

(72) Inventor: Francis Patrick Sullivan, Sandy, UT (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 17/694,488

(22) Filed: Mar. 14, 2022

(51) Int. Cl.
- G06F 3/048 (2013.01)
- G06F 3/04815 (2022.01)
- G06T 19/00 (2011.01)
- G06V 40/20 (2022.01)

(52) U.S. Cl.
CPC ........ G06F 3/04815 (2013.01); G06T 19/006 (2013.01); G06V 40/28 (2022.01)

(58) Field of Classification Search
CPC ... G06F 3/04815; G06V 40/28; G06T 19/006; G06T 19/003; G06T 19/00
See application file for complete search history.

(56) References Cited

U.S. PATENT DOCUMENTS

| | | |
|---|---|---|
| 7,971,156 B2 | 6/2011 | Albertson et al. |
| 9,225,897 B1 | 12/2015 | Sehn et al. |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,614,855 B2 | 4/2020 | Huang |
| 10,635,161 B2 * | 4/2020 | Clement ............. G06F 3/04847 |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,164,380 B2 * | 11/2021 | McHugh ............... G06F 3/0481 |

(Continued)

*Primary Examiner* — Haoshian Shih
(74) *Attorney, Agent, or Firm* — Schwegman Lundberg & Woessner, P.A.

(57) ABSTRACT

A head-worn device system includes one or more cameras, one or more display devices and one or more processors. The system also includes a memory storing instructions that, when executed by the one or more processors, configure the system to generate a virtual object, generate a virtual object collider for the virtual object, determine a conic collider for the virtual object, provide the virtual object to a user, detect a landmark on the user's hand in the real-world, generate a landmark collider for the landmark, and determine a selection of the first virtual object by the user based on detecting a collision between the landmark collider with the conic collider and with the virtual object collider.

22 Claims, 12 Drawing Sheets

(56) References Cited

U.S. PATENT DOCUMENTS

| | | | |
|---|---|---|---|
| 11,169,600 B1 | 11/2021 | Canberk et al. | |
| 11,227,626 B1 | 1/2022 | Krishnan Gorumkonda et al. | |
| 2015/0221132 A1* | 8/2015 | Kruglick | G06T 19/006 |
| | | | 345/633 |
| 2017/0329515 A1* | 11/2017 | Clement | G06F 3/04815 |
| 2018/0307303 A1* | 10/2018 | Powderly | G02B 27/0172 |
| 2019/0155397 A1* | 5/2019 | Liu | G06F 3/0482 |
| 2019/0295280 A1* | 9/2019 | DiVerdi | G06T 19/006 |
| 2020/0043236 A1* | 2/2020 | Miller | G06F 3/012 |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |

* cited by examiner

3D USER INTERFACE DEPTH FORGIVENESS

TECHNICAL FIELD

The present disclosure relates generally to display devices and more particularly to display devices used for augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality" or "AR." A head-worn device may additionally occlude a user's visual field and provide a virtual environment through which a user may move or be moved. This is typically referred to as "virtual reality" or "VR." Collectively, AR and VR as known as "XR" where "X" is understood to stand for either "augmented" or "virtual." As used herein, the term AR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
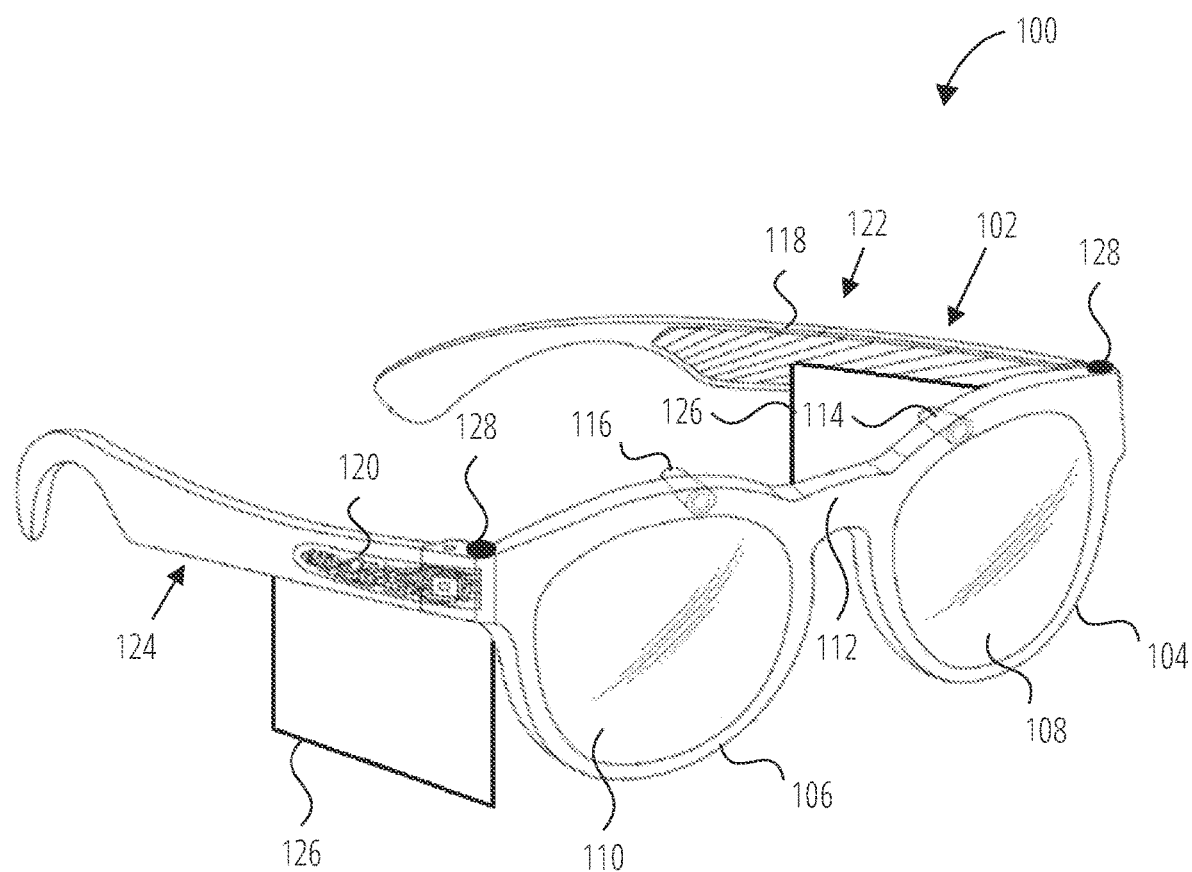
FIG. 1 is a perspective view of a head-worn device, in accordance with some examples.

In some examples, a user's interaction with software applications executing on an AR device is achieved using a 3D User Interface. The 3D user interface includes virtual objects provided to a user by the AR device in a 3D render that is provided to the user in a display of the 3D user interface. In the case of AR, the user perceives the virtual objects as objects within the real-world as viewed by the user while wearing the AR device. In the case of VR, the user perceives the virtual objects as objects within the virtual world as viewed by the user while wearing the AR device. To allow the user to interact with the virtual objects, the AR device detects the user's hand positions and movements and uses those hand positions and movements to determine the user's intentions in manipulating the virtual objects.

Generation of the 3D user interface and detection of the user's interactions with the virtual objects may also include detection of real-world objects (e.g., faces, hands, bodies, cats, dogs, surfaces, objects), tracking of such real-world objects as they leave, enter, and move around the field of view in video frames, and the modification or transformation of such real-world objects as they are tracked. In various examples, different methods for detecting the real-world objects and achieving such transformations may be used. For example, some examples may involve generating a 3D mesh model of a real-world object or real-world objects, and using transformations and animated textures of the model within the video frames to achieve the transformation. In other examples, tracking of points on a real-world object may be used to place an image or texture, which may be two dimensional or three dimensional, at the tracked position. In still further examples, neural network analysis of video frames may be used to place images, models, or textures in content (e.g., images or frames of video). AR effect data thus may include both the images, models, and textures used to create transformations in content, as well as additional modeling and analysis information used to achieve such transformations with real-world object detection, tracking, and placement.

To implement a user interface, an AR device may generate a 3D user interface including one or more virtual objects that constitute interactive elements of the 3D user interface. A virtual object may be described as a solid in a 3D geometry having values in 3-tuples of X (horizontal), Y (vertical), and Z (depth). A 3D render of the 3D user interface is generated and provided in a display to a user of the AR device. The AR device generates one or more respective virtual object colliders for the one or more virtual objects. A collider is a geometric shape in a 3D user interface that is used to detect contact or collision between virtual objects in a 3D user interface. A collider is sometimes termed a hitbox or collision geometry. Collisions between colliders are determined by detecting or finding an intersection between 3D geometric components of two or more colliders. That is, a collision between two or more colliders indicates that respective portions of each the two or more colliders intersect each other, are coincident, in contact, or touching within the 3D user interface. In a case of a point, a collision is determined if the point is located within a volume of a collider.

To provide a way for a user to interact with interactive elements of a 3D user interface, one or more user moveable colliders are provided based on a moveable object in the real-world, such as one or more of the user's hands. In some solutions, to produce a collider, video data is generated containing images of the user's hands as the user moves their hands. Feature extraction processes are used to detect features of the user's hands. An object detection process may then use the detected features to identify specific portions of the user's hands termed landmarks. A landmark collider process may then generate one or more landmark colliders in the 3D user interface corresponding to one or more detected landmarks on the user's hands. As the landmark colliders correspond to landmarks on the user's hands, the user may move one or more portions of their hands to move the landmark colliders within the 3D user interface. A user interaction with an interactive element represented by a virtual object may be determined by detecting a collision between a landmark collider corresponding to the user's hand and a collider of the virtual object corresponding to the interactive element.

When interacting with virtual objects using an AR device, there are a few different sources of error that can make it difficult for the user to achieve an intended user interaction. Some sources of error include random hand tracking errors. These are caused by fluctuations in hand tracking models. Since the errors are random, their average is zero, but an individual sample will have some inaccuracy associated with it, in a magnitude and direction that is hard to predict, causing "jumps" from one frame to the next. Systematic hand tracking errors can be introduced into an interaction as well. If the size of a user's hand is unknown, and an estimate regarding the hand size is too large, then the hand will be judged as being further away than the hand really is. These errors persist from one frame to the next. There can also be errors introduced by limitations of the user's depth perception. Especially in AR, where some depth cues are missing, users tend to misjudge the depth of virtual objects. For example, in an instance of a virtual sphere that lights up when a user touch it, if the user misjudges the distance to the sphere, they may not be interacting with it even if they think they are. Even if the user's finger is in the right place, systematic errors may cause the AR device to believe that the finger is not colliding with or intersecting the sphere. Random errors may also affect the interaction. Since these errors change unpredictably from one frame to the next, the user may even experience a noisy "bounce" whereby the sphere flickers on and off. This can also cause the user to spuriously disengage from interacting with the object, when that was not their intention.

One solution to this problem is to expand the size of a virtual object's collider. For instance, if the virtual object is a sphere that has a radius of 10 cm, create an invisible collider sphere of 1 having a radius of 12 cm and cause the sphere light up whenever the user touches the larger collider. This gives 2 cm of "forgiveness" in any direction. Any inaccuracies within this margin are excused. A problem with this solution is that, often, it becomes apparent that the sphere is lighting up before the user actually touches it. For some applications, this may be acceptable. However, for some more delicate applications involving small colliders (compared to the size of a user's hand), this strategy can make it too easy to interact with the collider, resulting in unintended interactions (false positives). This can be noted on the sides of the object, where depth perception is not as relevant. As another example problem, when a user is trying to disengage from an interaction, such as the press of a button or pinching a slider knob, this disengagement may come later than the user expects, perhaps causing the button to be pressed for too long, or for the slider knob to move unintentionally.

Sometimes the sources of error are more pronounced in the "depth" direction. Limitations of the user's depth perception are depth-related by definition. Systematic hand tracking errors mostly involve improperly calculating the hand's distance from a hand sensor based on incorrect assumptions about the size of the user's hand. In addition, random errors may not be totally uniformly distributed, and show much greater variance in the z or depth direction. Therefore, more "forgiveness" is desired in the depth direction than in the horizontal or vertical directions. In addition, limitations in the user's depth perception means that more forgiveness can be afforded in the depth direction before it becomes apparent to the user.

In some examples, extra "forgiveness" may be provided in the in the depth (z) direction, and less forgiveness in the horizontal (x) and vertical (y) directions. Such forgiveness may be provided by defining a collision volume or collider where depth is ignored. Using a virtual object that is a sphere as an example, a sphere collider may be replaced with a conic collider such that: the vertex point of the conic collider is at an eye position of a user; an axis of the conic collider runs through the centroid of the original virtual object (in this example, the sphere.) The radius of the conic collider is equal to the radius of the virtual object, at the distance of the virtual object within the 3D user interface. As a result, if a landmark of a user's hand, such as the user's finger, intersects with the conic collider, no matter where, the landmark will appear from the user's perspective to be overlapping with the sphere. In this manner, depth is ignored completely; however, by adding a second collision volume or collider in the form of an expanded sphere collider that has the same center point as the original sphere, but has a larger radius, depth forgiveness can be achieved that provides an element of directness to the user interaction. It may be determined that a point is colliding or inside an intersection between the conic collider and the expanded sphere collider by testing to see if the point is within both the conic collider and the expanded sphere collider. This compound collision volume, the intersection between the conic collider and the expanded sphere collider, may have the same silhouette as the original sphere from the user's perspective, but is expanded along the "depth" (z) axis. As a result, this collision volume introduces depth forgiveness without introducing any forgiveness in the horizontal or vertical directions. If some forgiveness in a horizontal (x) and vertical (y) direction is desired, two spheres may be utilized. A first expanded sphere may be used as the basis for constructing the conic collider while a second expanded sphere may be used to construct the expanded sphere collider. When a radius of the first sphere is smaller than a radius of the second sphere, the radius of the conic collider at the distance of the first or smaller sphere will be smaller than a radius of the expanded sphere collider at the position of the second or larger sphere. This results in a final collision volume that is expanded somewhat in the horizontal and vertical directions (from the user's perspective), but expanded to a larger extent along the "depth" or z direction.

In some solutions, one or more 3D joint landmark positions on a user's hand position are converted into a ray (starting at the eye position, and passing through the original 3D joint landmark position) and testing for an intersection or collision of that ray with a sphere collider circumscribing a virtual object, such as a sphere. This, combined with making sure that the original 3D landmark positions are inside the expanded sphere collider may provide a similar result as using a conic collider and a sphere collider.

In some solutions, a virtual object is generated within a 3D user interface and a virtual object collider and a conic collider are generated for the virtual object. The virtual object may be part of the 3D user interface and intended to serve as an interactive object within the 3D user interface and occupies a portion of the 3D user interface when the 3D user interface is provided to a user. The virtual object is provided to the user by being displayed to the user within the 3D user interface and the user's hands are detected in the real-world including detecting a landmark on the user's hand. A landmark collider is generated for the landmark and a user interaction by the user with the virtual object is determined based on detecting a collision between the landmark collider with the conic collider and with the virtual object collider.

Other technical features may be readily apparent to one skilled in the art from the following figures, descriptions, and claims.

FIG. 1 is perspective view of a head-worn AR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 302 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include one or more cameras, such as a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
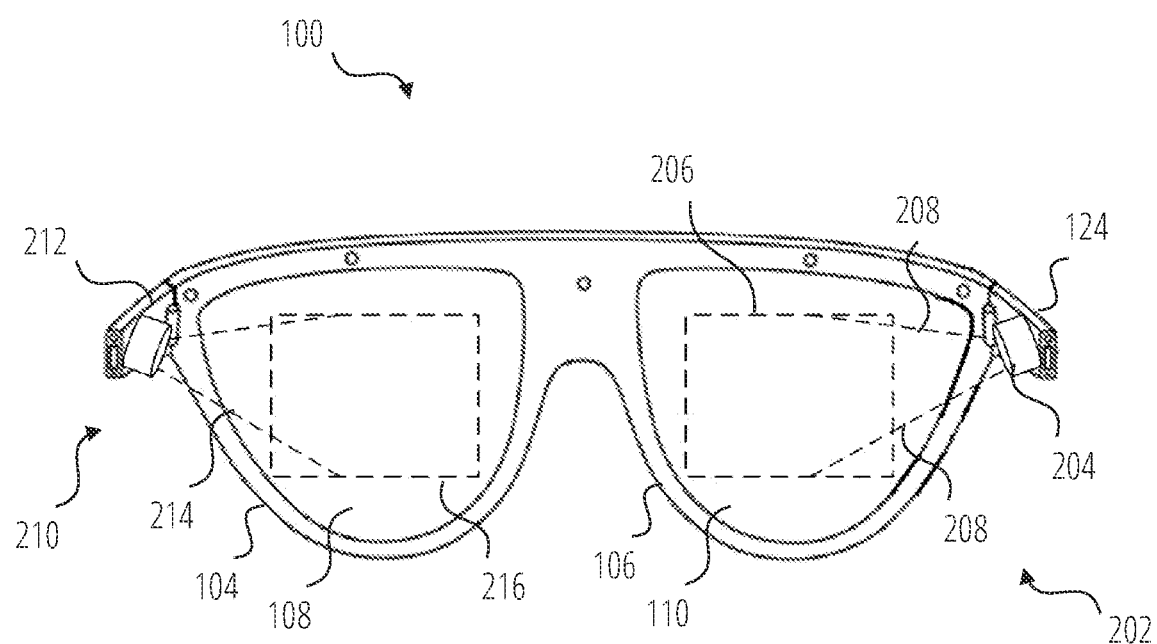
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world seen by the user. The combination of a GPU, the forward optical assembly 202, the left optical element 108, and the right optical element 110 provide an optical engine of the glasses 100. The glasses 100 use the optical engine to generate an overlay of the real-world view of the user including providing a display of a 3D user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various 3D user interfaces on the near eye displays. As described in more detail herein, the user can then interact with the glasses 100 using a touchpad 126 and/or the buttons 128, voice inputs or touch inputs on an associated device (e.g. client device 328 illustrated in FIG. 3), and/or hand movements, locations, and positions detected by the glasses 100.

Figure 3:
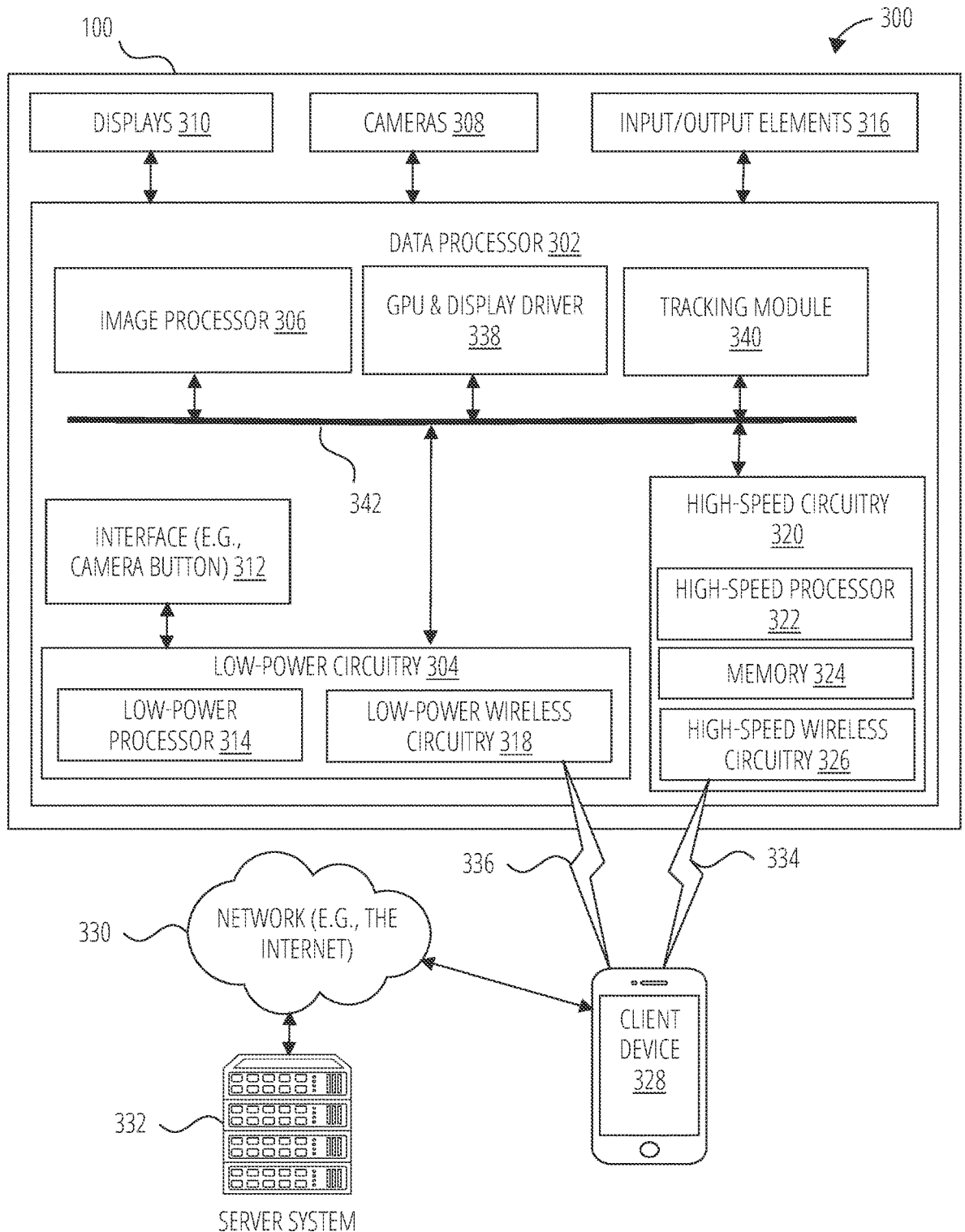
FIG. 3 is a block diagram illustrating a networked system 300 including details of the head-worn device of FIG. 1, in accordance with some examples.

FIG. 3 is a block diagram illustrating a networked system 300 including details of the glasses 100, in accordance with some examples. The networked system 300 includes the glasses 100, a client device 328, and a server system 332. The client device 328 may be a smartphone, tablet, phablet, laptop computer, access point, or any other such device capable of connecting with the glasses 100 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 504 or the machine 1200 described in FIG. 5 and FIG. 12 respectively.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 5 and FIG. 12. For example, the input/output elements 316 may include any of I/O components 1206 including output components 1228, motion components 1236, and so forth. Examples of the displays 310 are discussed in FIG. 2. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system such as the operating system 512 of FIG. 5. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 100. For example, the tracking module 340 uses image data and corresponding inertial data from the cameras 308 and the position components 1240, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the client device 328, or on a remote server. For example, one or more functions or operations described herein may be performed by one of the applications 506 such as messaging application 546.

Figure 4:
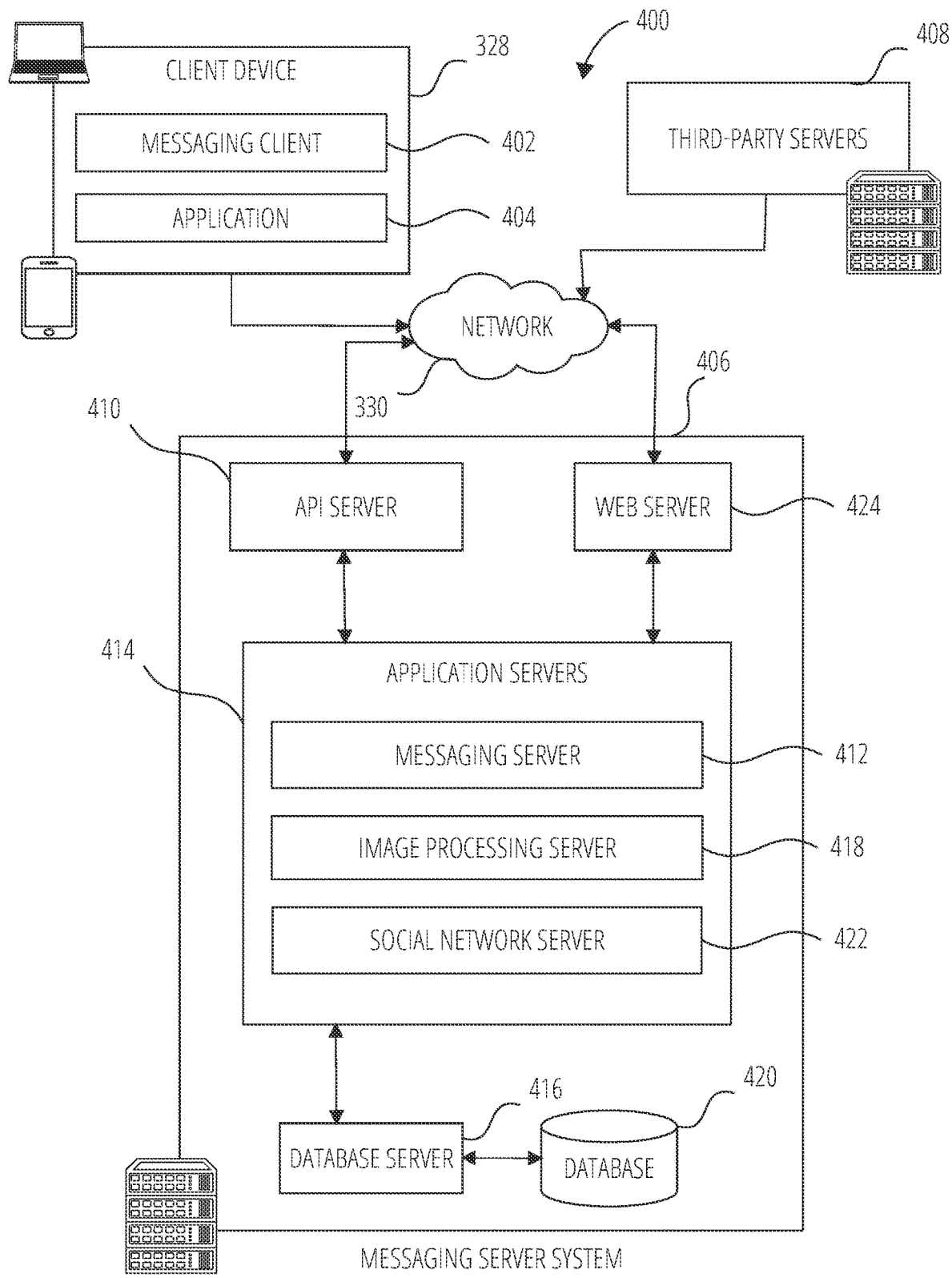
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 328 which host a number of applications, including a messaging client 402 and other applications 404. A messaging client 402 is communicatively coupled to other instances of the messaging client 402 (e.g., hosted on respective other client devices 328), a messaging server system 406 and third-party servers 408 via a network 330 (e.g., the Internet). A messaging client 402 can also communicate with locally-hosted applications 404 using Application Program Interfaces (APIs).

A messaging client 402 is able to communicate and exchange data with other messaging clients 402 and with the messaging server system 406 via the network 330. The data exchanged between messaging clients 402, and between a messaging client 402 and the messaging server system 406, includes functions (e.g., commands to invoke functions) as well as payload data (e.g., text, audio, video or other multimedia data).

The messaging server system 406 provides server-side functionality via the network 330 to a particular messaging client 402. While some functions of the messaging system 400 are described herein as being performed by either a messaging client 402 or by the messaging server system 406, the location of some functionality either within the messaging client 402 or the messaging server system 406 may be a design choice. For example, it may be technically preferable to initially deploy some technology and functionality within the messaging server system 406 but to later migrate this technology and functionality to the messaging client 402 where a client device 328 has sufficient processing capacity.

The messaging server system 406 supports various services and operations that are provided to the messaging client 402. Such operations include transmitting data to, receiving data from, and processing data generated by the messaging client 402. This data may include message content, client device information, geolocation information, media augmentation and overlays, message content persistence conditions, social network information, and live event information, as examples. Data exchanges within the messaging system 400 are invoked and controlled through functions available via user interfaces (UIs) of the messaging client 402.

Turning now specifically to the messaging server system 406, an Application Program Interface (API) server 410 is coupled to, and provides a programmatic interface to, application servers 414. The application servers 414 are communicatively coupled to a database server 416, which facilitates access to a database 420 that stores data associated with messages processed by the application servers 414. Similarly, a web server 424 is coupled to the application servers 414, and provides web-based interfaces to the application servers 414. To this end, the web server 424 processes incoming network requests over the Hypertext Transfer Protocol (HTTP) and several other related protocols.

The Application Program Interface (API) server 410 receives and transmits message data (e.g., commands and message payloads) between the client device 328 and the application servers 414. Specifically, the Application Program Interface (API) server 410 provides a set of interfaces (e.g., routines and protocols) that can be called or queried by the messaging client 402 in order to invoke functionality of the application servers 414. The Application Program Interface (API) server 410 exposes various functions supported by the application servers 414, including account registration, login functionality, the sending of messages, via the application servers 414, from a particular messaging client 402 to another messaging client 402, the sending of media files (e.g., images or video) from a messaging client 402 to a messaging server 412, and for possible access by another messaging client 402, the settings of a collection of media data (e.g., story), the retrieval of a list of friends of a user of a client device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 402).

The application servers 414 host a number of server applications and subsystems, including for example a messaging server 412, an image processing server 418, and a social network server 422. The messaging server 412 implements a number of message processing technologies and functions, particularly related to the aggregation and other processing of content (e.g., textual and multimedia content) included in messages received from multiple instances of the messaging client 402. As will be described in further detail, the text and media content from multiple sources may be aggregated into collections of content (e.g., called stories or galleries). These collections are then made available to the messaging client 402. Other processor and memory intensive processing of data may also be performed server-side by the messaging server 412, in view of the hardware requirements for such processing.

The application servers 414 also include an image processing server 418 that is dedicated to performing various image processing operations, typically with respect to images or video within the payload of a message sent from or received at the messaging server 412.

The social network server 422 supports various social networking functions and services and makes these functions and services available to the messaging server 412. To this end, the social network server 422 maintains and accesses an entity graph within the database 420. Examples of functions and services supported by the social network server 422 include the identification of other users of the messaging system 400 with which a particular user has relationships or is "following," and also the identification of other entities and interests of a particular user.

The messaging client 402 can notify a user of the client device 328, or other users related to such a user (e.g., "friends"), of activity taking place in shared or shareable sessions. For example, the messaging client 402 can provide participants in a conversation (e.g., a chat session) in the messaging client 402 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 5:
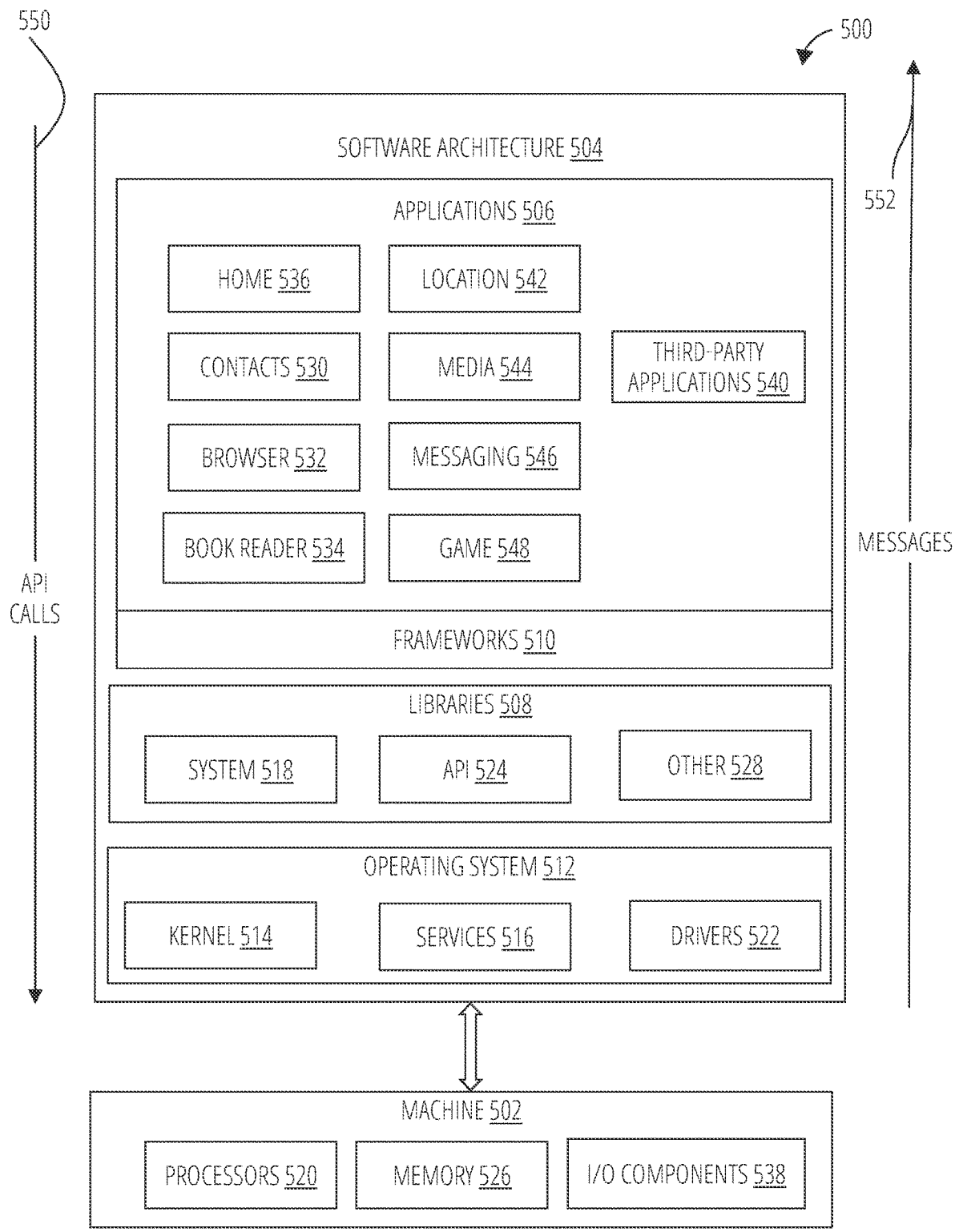
FIG. 5 is a block diagram showing a software architecture within which the present disclosure may be implemented, in accordance with some examples.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where individual layers provides a particular functionality. The software architecture 504 includes layers such as an operating system 512, libraries 508, frameworks 510, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionalities. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 508 provide a low-level common infrastructure used by the applications 506. The libraries 508 can include system libraries 518 (e.g., C standard library) that provide functions such as memory allocation functions, string manipulation functions, mathematic functions, and the like. In addition, the libraries 508 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 508 can also include a wide variety of other libraries 528 to provide many other APIs to the applications 506.

The frameworks 510 provide a high-level common infrastructure that is used by the applications 506. For example, the frameworks 510 provide various graphical user interface (GUI) functions, high-level resource management, and high-level location services. The frameworks 510 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as third-party applications 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party applications 540 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 540 can invoke the API calls 550 provided by the operating system 512 to facilitate functionality described herein.

Figure 6:
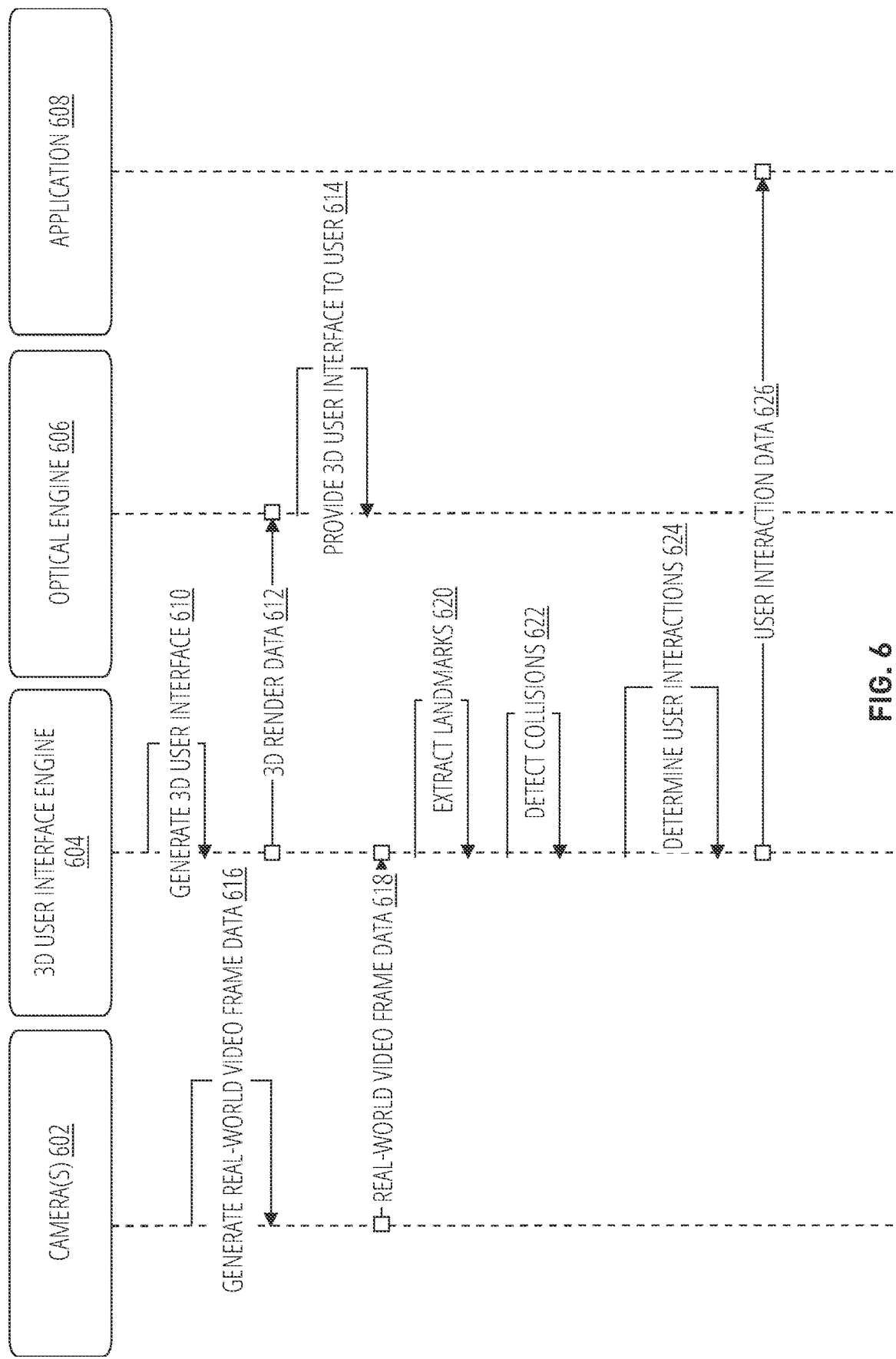
FIG. 6 illustrates a 3D user interface generation and utilization process in accordance with some examples.
Figure 7:
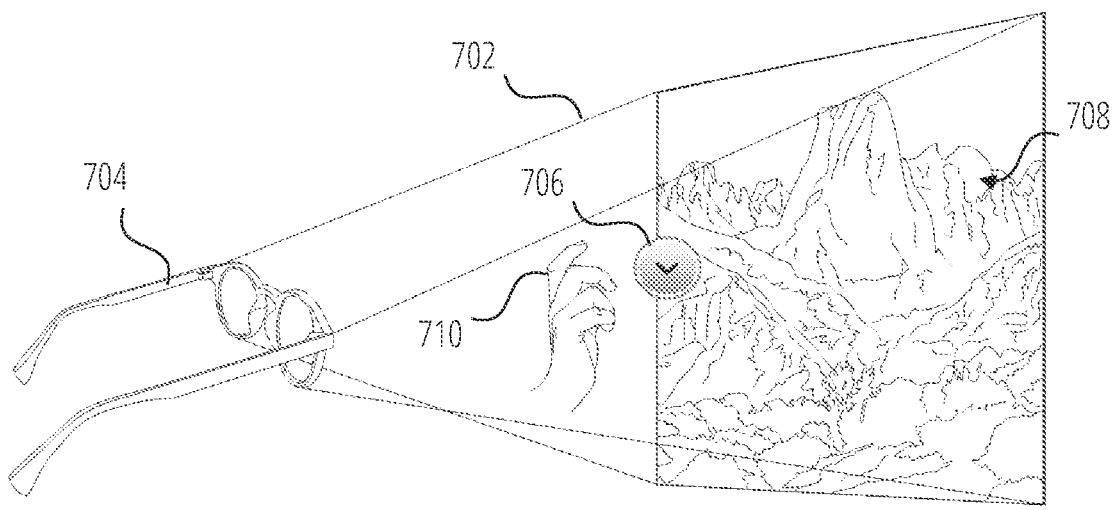
FIG. 7 illustrates a 3D user interface in accordance with some examples.

Referring now FIG. 6 and FIG. 7, FIG. 6 depicts a sequence diagram of an example 3D user interface process and FIG. 7 depicts the 3D user interface 702 of glasses 704 in accordance with some examples. During the process, a 3D user interface engine 604 generates 610 the 3D user interface 702 including one or more virtual objects 706 that constitute interactive elements of the 3D user interface 702. A virtual object may be described as a solid in a 3D geometry having values in 3-tuples of X (horizontal), Y (vertical), and Z (depth). A 3D render of the 3D user interface 702 is generated and 3D render data 612 is communicated to an optical engine 606 of the glasses 704 and provided in a display 614 to a user of the glasses 704.

One or more cameras 602 of the glasses 704 generate 616 real-world video frame data 618 of the real-world 708 as viewed by the user of the glasses 704. Included in the real-world video frame data 618 is hand movement video frame data of how the user is moving one or more of their hands, hand position video frame data of what positions the user is holding their hands while making movements, and hand location video frame data of where in the real-world one or more of the user's hands are located (collectively hand movement, location, and position video frame data) from a viewpoint of the user while wearing the glasses 704 and viewing the projection of the 3D render of the 3D user interface 702 by the optical engine 606. The 3D user interface engine 604 utilizes the hand movement, location, and position video frame data in the real-world video frame data 618 to extract landmarks 620 of the user's hands from the real-world video frame data 618 and generates one or more landmark colliders corresponding to one or more landmarks of one or more of the user's hands. The landmark colliders are used to determine user interactions between the user and the virtual object by detecting collisions 622 between the landmark colliders and respective colliders of the virtual objects. The collisions are used by the 3D user interface engine 604 to determine user interactions 624 by the user with the virtual objects. The 3D user interface engine 604 communicates user interaction data 626 of the user interactions to an application 608 for utilization by the application 608.

In some examples, one or more real-world objects detected in the real-world may be used as a basis for a virtual object. To do so, real-world object video frame data included in real-world video frame data 618 is used to generate one or more 3D mesh models corresponding to the one or more real-world objects and one or more virtual object colliders are generated for the one or more 3D mesh models. In other examples, one or more feature extraction processes are used to extract one or more features of the one or more real-world objects from the real-world video frame data. One or more virtual object colliders are generated based on the one or more features.

In some examples, the application 608 performs the functions of the 3D user interface engine 604 by utilizing various APIs and system libraries to receive and process the real-world video frame data 618 and instruct the optical engine 606.

In some examples, a user wears one or more sensor gloves on the user's hands that generate sensed hand position data and sensed hand location data that is used to generate the landmark colliders. The sensed hand position data and sensed hand location data are communicated to the optical engine 606 and used by the optical engine 606 in lieu of or in combination with the hand location video frame data and hand position video frame data to generate landmark colliders for one or more landmarks on one or more of the user's hands.

Figure 8:
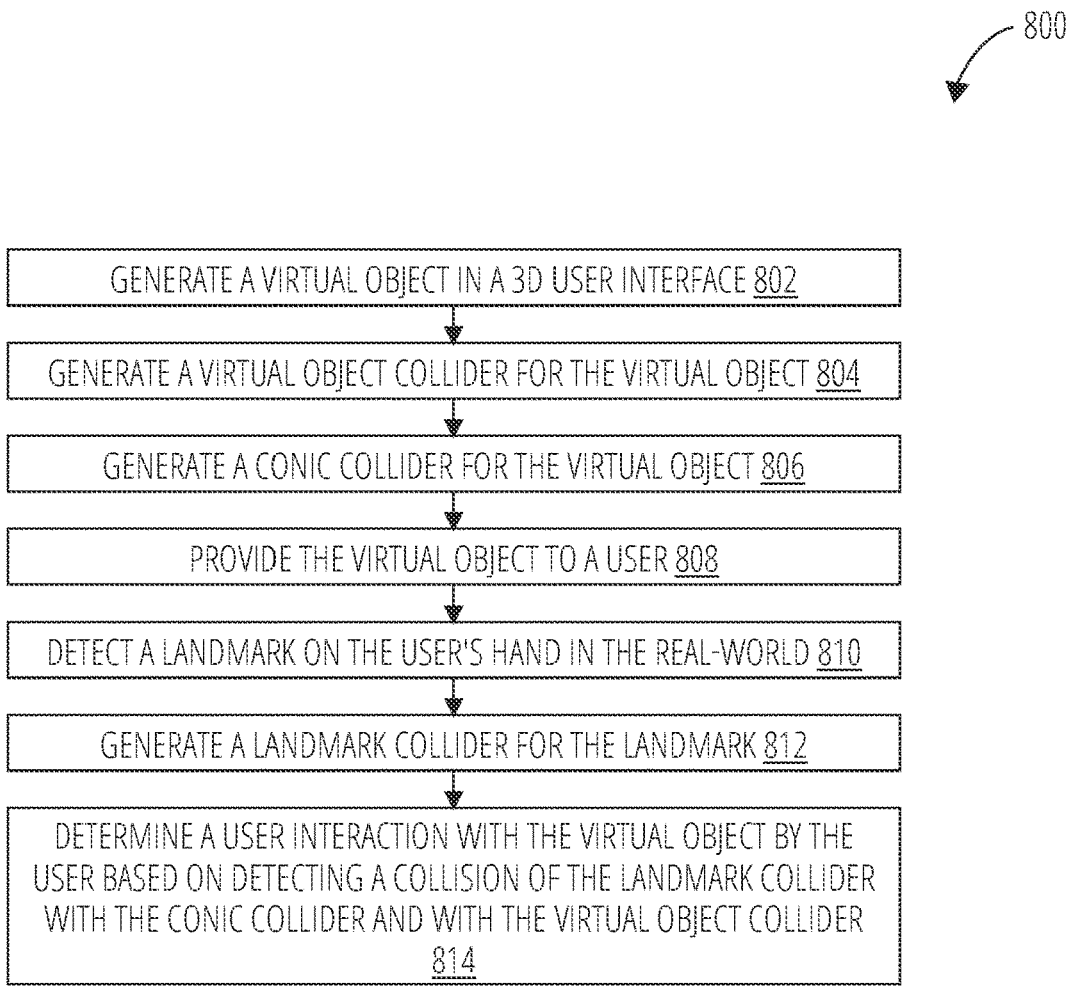
FIG. 8 illustrates another 3D user interface generation and utilization process in accordance with some examples.
Figure 9:
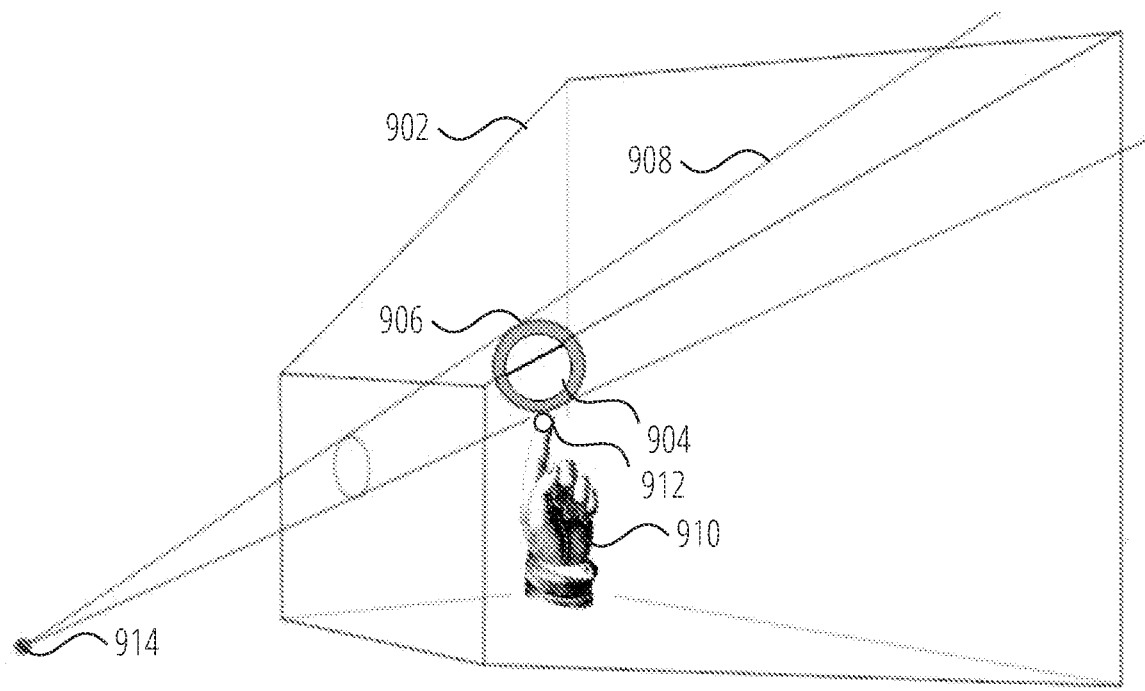
FIG. 9 illustrates another 3D user interface in accordance with some examples.

Referring now to FIG. 8 and FIG. 9, FIG. 8 is a process flow diagram of a depth forgiveness process 800 of a 3D user interface as depicted in FIG. 9 in accordance with various examples. 3D user interfaces include 3D renders of virtual objects that are provided in a display to a user. When interacting with the 3D user interface, a user manipulates the virtual objects such that, form the user's perspective, the virtual objects have a collision or collide. To detect these collisions, a 3D user interface engine uses 3D geometric objects termed collision volumes, hitboxes, or colliders. In some examples, a collider may be "invisible" to a user, that is, the collider geometry is not part of a 3D render that is provided in a display to a user. In some examples, a collider may be visible to the user. In some embodiments, a collider may be the 3D geometry of the virtual object itself.

Colliders define a volume within the 3D user interface, and to detect a collision or intersection between two colliders, a 3D user interface engine determines if there is a geometric intersection between the volumes defined by the colliders. Depth forgiveness may be provided by defining a collision volume or collider where depth is ignored. Using a virtual object that is a sphere as an example, a sphere collider may be replaced with a cone shaped or conic collider such that the vertex point of the conic collider is at an eye position of a user, and an axis of the conic collider runs through the centroid of the original virtual object (in this example, the sphere.) The conic collider is defined such that a radius of the conic collider is equal to a radius of the virtual object at the distance of the virtual object within the 3D user interface. As a result, if a landmark collider created based on a landmark of a user's hand, such as the user's finger, intersects with the conic collider, no matter where, the landmark will appear from the user's perspective to be overlapping with the sphere. In this manner, depth is ignored completely; however, by adding a second collision volume or collider in the form of an expanded sphere collider that has the same center point as the original sphere, but has a larger radius, depth forgiveness can be achieved that provides an element of directness to the user interaction. It may be determined that a point is inside an intersection between the conic collider and the expanded sphere collider by testing to see if the point is within both the conic collider and the expanded sphere collider. This compound collision volume, the intersection between the conic collider and the expanded sphere collider, may have the same silhouette as the original sphere from the user's perspective, but is expanded along the "depth" (z) axis. As a result, this collision volume introduces depth forgiveness without introducing any forgiveness in the horizontal or vertical directions. If some forgiveness in a horizontal (x) and vertical (y) direction is desired, a small expanded sphere may be used as the basis for constructing the conic collider while a larger expanded sphere may be used to construct the expanded sphere collider. That is, the radius of the conic collider at the distance of the original sphere is smaller than a radius of the expanded sphere collider. This results in a final collision volume or collider that is expanded somewhat in the horizontal and vertical directions (from the user's perspective), but expanded to a larger extent along the "depth" or z direction.

To implement depth forgiveness in a 3D user interface, a depth forgiveness process 800 generates 802 a virtual object 904 in the 3D user interface 902 and generates 804 a virtual object collider 906 for the virtual object. depth forgiveness process 800 also generates 806 a conic collider 908 for the virtual object and provides in a display 808 the virtual object 904 to a user. To determine a user's interaction with the virtual object 904, the depth forgiveness process 800 detects 810 a landmark on a hand 910 of the user and generates 812 a landmark collider 912 for the landmark. The depth forgiveness process 800 determines 814 a user interaction with the virtual object 904 by the user based on detecting a collision between the landmark collider 912 with the conic collider 908 and with the virtual object collider 906.

In some examples, an axis of the conic collider 908 runs through a centroid of the virtual object 904.

In some examples, a vertex point of the conic collider 908 is at an eye position 914 of the user.

In some examples, a radius of a base of the conic collider 908 is equal to a radius of a sphere circumscribing the virtual object 904.

In some examples, a radius of a base of the conic collider 908 is greater than a radius of a sphere circumscribing the virtual object 904.

In some examples, the virtual object 904 has an irregular outline composed of segments and one or more polygonal cone colliders are generated where at one or more segments of a base polygon of the polygonal cone colliders coincides with a segment of the virtual object 904 outline.

In some examples, the landmark is detected using one or more cameras. In some examples, one or more cameras (such as camera 114 and/or camera 116 of FIG. 1) are used to generate real-world video frame data (such as real-world video frame data 616 of FIG. 6). One or more feature extraction processes are used to detect features of the user's hands using hand movement, location, and position video frame data of the real-world video frame data and one or more object detection processes may use the detected features to identify specific portions of the user's hands as landmarks.

In some examples, the virtual object 904 is generated based on real-world video frame data. To do so, a 3D mesh model of a real-world object or real-world objects is generated from the real-world video frame data and a circumscribing collider is generated around the mesh. In other examples, tracking of points on a real-world object may be used to place a collider at a tracked position. In still further examples, neural network analysis of video frames may be used to place colliders within the 3D render of the 3D user interface. Accordingly, a 3D user interface may include interactive elements composed from real-world objects using real-world object detection, tracking, and placement.

In some examples, a radius of a base of the conic collider is equal to a radius of a sphere circumscribing the virtual object 904 created from real-world video frame data.

In some examples, a virtual object collider 906 is not utilized. Instead a conic collider 908 is utilized. In such examples, depth forgiveness process 800 determines a user interaction with the virtual object 904 by the user based on detecting a collision between the landmark collider 912 with the conic collider 908.

Figure 10:
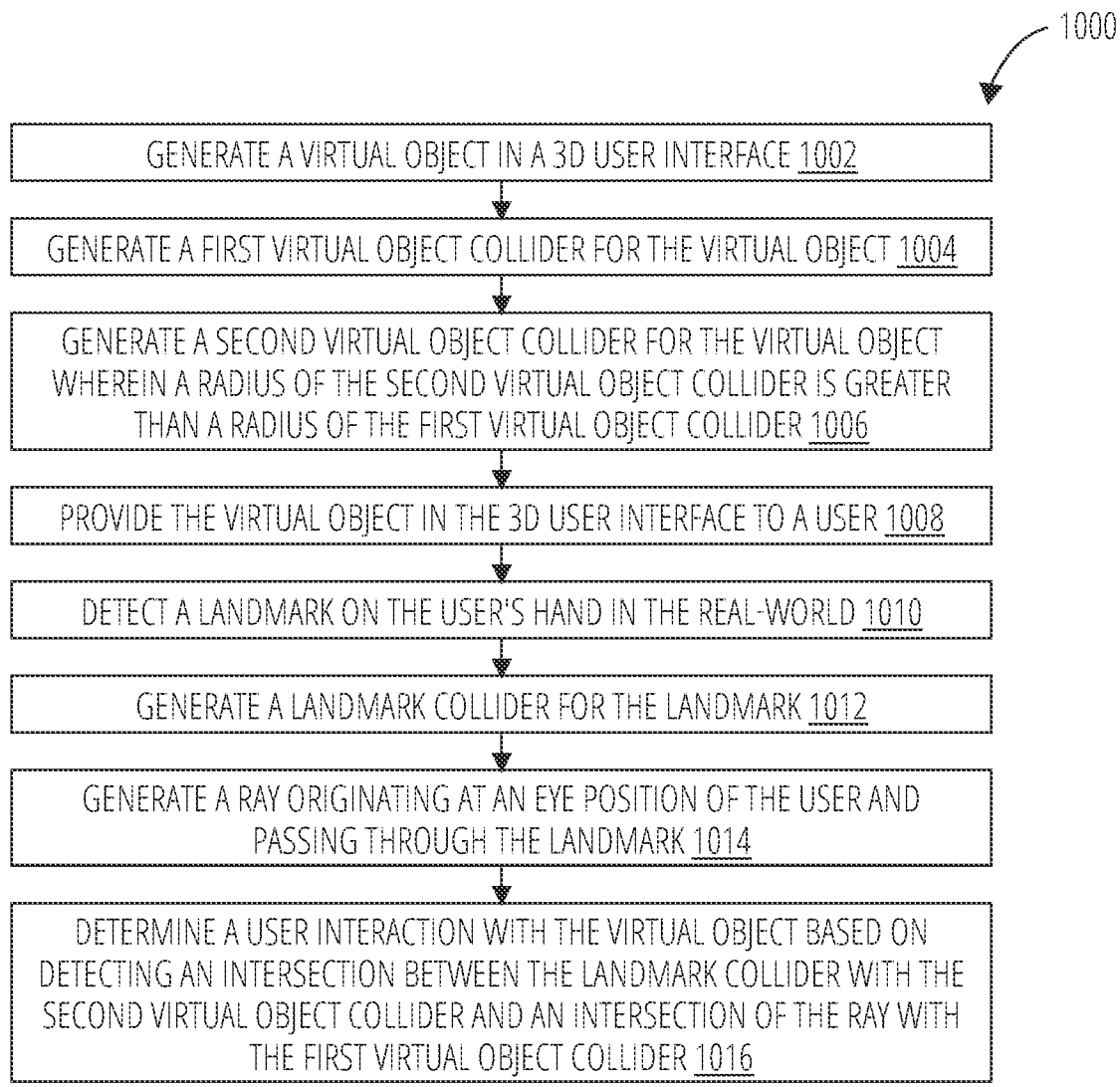
FIG. 10 illustrates another 3D user interface generation and utilization process in accordance with some examples.
Figure 11:
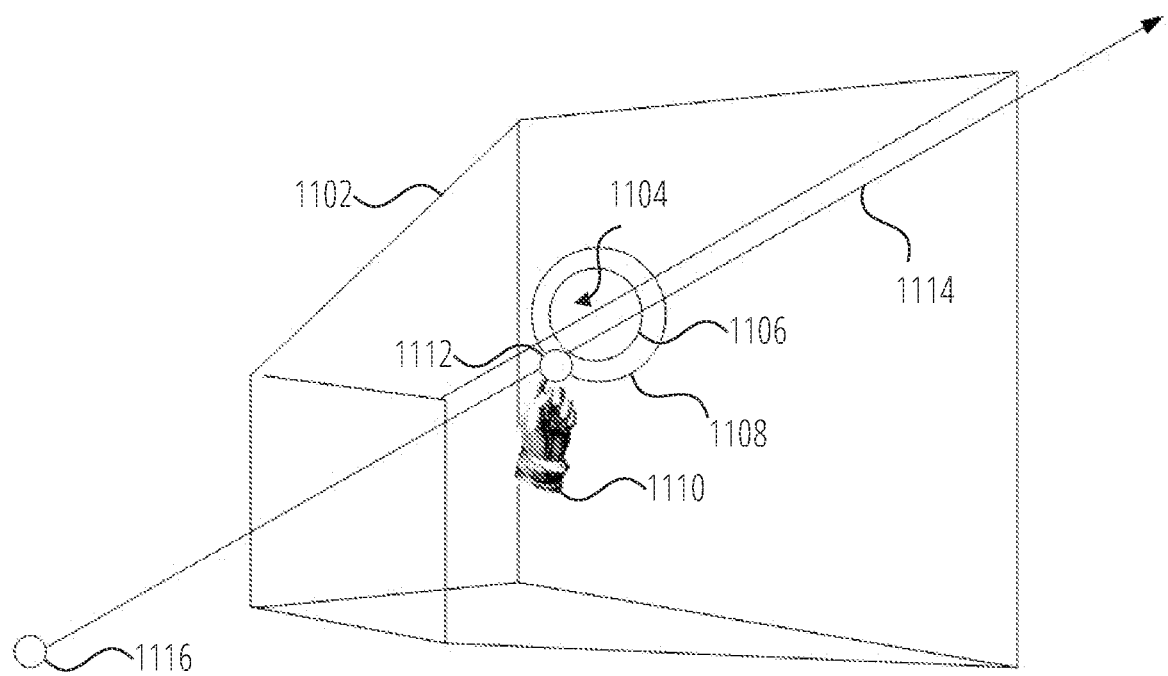
FIG. 11 illustrates another 3D user interface in accordance with some examples.

Referring now to FIG. 10 and FIG. 11, FIG. 10 is a process flow diagram of a process 1000 of a 3D user interface 1102 as depicted in FIG. 11 in accordance with various examples. Process 1000 generates 1002 a virtual object 1104 in the 3D user interface 1102 and generates 1004 a first virtual object collider 1106 for the virtual object 1104 and generates 1006 a second virtual object collider 1108 for the virtual object 1104 wherein a radius of the second virtual object collider 1108 is greater than a radius of the first virtual object collider 1106. The process 1000 provides in a display 1008 the virtual object 1104 to a user. Process 1000 detects 1010 a landmark on the user's hand 1110 in the real-world and generates 1012 a landmark collider 1112 for the landmark. Process 1000 generates 1012 a ray 1114 originating at an eye position 1116 of the user and passing through the landmark. Process 1000 determines 1016 a user interaction with the virtual object 1104 based on detecting 1014 an intersection or collision between the landmark collider 1112 with the second virtual object collider 1108 and a collision of the ray 1114 with the first virtual object collider 1106.

In some examples, an axis of the conic collider 908 runs through a centroid of the virtual object 904.

In some examples, a radius of the first virtual object collider 1106 is equal to a radius of a sphere circumscribing the virtual object 1104.

In some examples, the landmark is detected using one or more cameras.

In some examples, the landmark is sensed using a sensor glove. To do so, a user wears one or more sensor gloves on the user's hands that generate sensed hand position data and sensed hand location data. As the geometry of a glove is known, the sensed hand position data and sensed hand location data can be used to determine location data of a specific portion of the sensor glove that corresponds to a respective landmark of the user's hand. The determined landmark data may be used to generate the landmark colliders. The sensed hand position data and sensed hand location data are communicated to the optical engine 606 and used by the optical engine 606 in lieu of or in combination with the hand location video frame data and hand position video frame data to generate landmark colliders for one or more landmarks on one or more of the user's hands.

In some examples, the virtual object 904 is generated based on real-world video frame data.

In some examples, process 1000 determines a user interaction with the virtual object 1104 based on detecting an intersection or collision between the ray 1114 with the first virtual object collider 1106.

Figure 12:
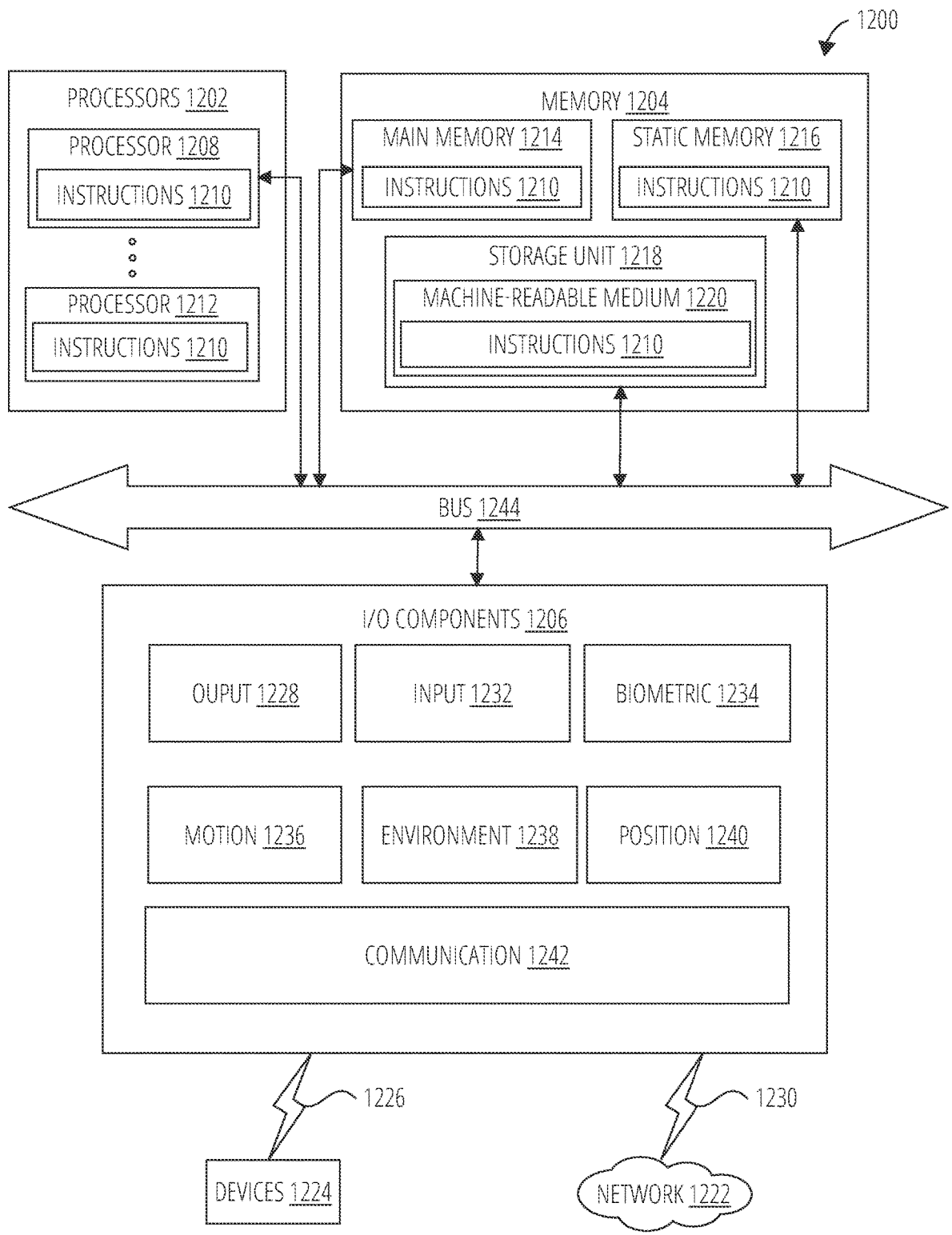
FIG. 12 is a diagrammatic representation of a machine, in the form of a computer system within which a set of instructions may be executed for causing the machine to perform any one or more of the methodologies discussed herein in accordance with some examples.

FIG. 12 is a diagrammatic representation of a machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while a single machine 1200 is illustrated, the term "machine" may also be taken to include a collection of machines that individually or jointly execute the instructions 1210 to perform any one or more of the methodologies discussed herein.

The machine 1200 may include processors 1202, memory 1204, and I/O components 1206, which may be configured to communicate with one another via a bus 1244. In an example, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1214, a static memory 1216, and a storage unit 1218, both accessible to the processors 1202 via the bus 1244. The main memory 1204, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within one ore more of the processors 1202 (e.g., within the processor's cache memory), or any suitable combination thereof, during execution thereof by the networked system 300.

The I/O components 1206 may include a wide variety of components to receive input, provide output, produce output, transmit information, exchange information, capture measurements, and so on. The specific I/O components 1206 that are included in a particular machine will depend on the type of machine. For example, portable machines such as mobile phones may include a touch input device or other such input mechanisms, while a headless server machine will likely not include such a touch input device. It will be appreciated that the I/O components 1206 may include many other components that are not shown in FIG. 12. In various examples, the I/O components 1206 may include output components 1228 and input components 1232. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1232 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1206 may include biometric components 1234, motion components 1236, environmental components 1238, or position components 1240, among a wide array of other components. For example, the biometric components 1234 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1236 include acceleration sensor components (e.g., accelerometer), gravitation sensor components, rotation sensor components (e.g., gyroscope), and so forth. The environmental components 1238 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1240 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1206 further include communication components 1242 operable to couple the networked system 300 to a network 1222 or devices 1224 via a coupling 1230 and a coupling 1226, respectively. For example, the communication components 1242 may include a network interface component or another suitable device to interface with the network 1222. In further examples, the communication components 1242 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1242 may detect identifiers or include components operable to detect identifiers. For example, the communication components 1242 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1242, such as location via Internet Protocol (IP) geolocation, location via Wi-Fi® signal triangulation, location via detecting an NFC beacon signal that may indicate a particular location, and so forth.

The various memories (e.g., memory 1204, main memory 1214, static memory 1216, and/or memory of the processors 1202) and/or storage unit 1218 may store one or more sets of instructions and data structures (e.g., software) embodying or used by any one or more of the methodologies or functions described herein. These instructions (e.g., the instructions 1210), when executed by processors 1202, cause various operations to implement the disclosed examples.

The instructions 1210 may be transmitted or received over the network 1222, using a transmission medium, via a network interface device (e.g., a network interface component included in the communication components 1242) and using any one of a number of well-known transfer protocols (e.g., hypertext transfer protocol (HTTP)). Similarly, the instructions 1210 may be transmitted or received using a transmission medium via the coupling 1226 (e.g., a peer-to-peer coupling) to the devices 1224.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
generating a virtual object;
determining a virtual object collider for the virtual object;
determining a conic collider for the virtual object;
providing the virtual object to a user;
detecting a landmark on a hand of the user;
generating a landmark collider for the landmark; and
determining a user interaction with the virtual object by the user based on detecting a collision between the landmark collider with the conic collider and with the virtual object collider.

2. The method of claim 1 wherein an axis of the conic collider runs through a centroid of the virtual object.

3. The method of claim 1 wherein a point of the conic collider is at an eye position of the user.

4. The method of claim 1 wherein a radius of a base of the conic collider is equal to a radius of a sphere circumscribing the virtual object.

5. The method of claim 1 wherein a radius of a base of the conic collider is greater than a radius a sphere circumscribing the virtual object.

6. The method of claim 1 wherein the landmark is detected using one or more cameras.

7. The method of claim 1 wherein the virtual object is generated based on real-world video frame data.

8. The method of claim 7 wherein a radius of a base of the conic collider is equal to a radius of a sphere circumscribing the virtual object.

9. A computing apparatus comprising:
a processor; and
a memory storing instructions that, when executed by the processor, configure the apparatus to:
generate a virtual object;
determine a virtual object collider for the virtual object;
determine a conic collider for the virtual object;
provide the virtual object to a user;
detect a landmark on the user's hands;
generate a landmark collider for the landmark; and
determine a user interaction with the virtual object by the user based on detecting a collision between the landmark collider with the conic collider and with the virtual object collider.

10. The computing apparatus of claim 9 wherein an axis of the conic collider runs through a centroid of the virtual object.

11. The computing apparatus of claim 9 wherein a point of the conic collider is at an eye position of the user.

12. The computing apparatus of claim 9 wherein a radius of a base of the conic collider is equal to a radius of a sphere circumscribe the virtual object.

13. The computing apparatus of claim 9 wherein a radius of a base of the conic collider is greater than a radius a sphere circumscribe the virtual object.

14. The computing apparatus of claim 9 wherein the landmark is detected using one or more cameras.

15. The computing apparatus of claim 9 wherein the computing apparatus is a head-worn AR device.

16. The computing apparatus of claim 15 wherein the head-worn AR device is glasses.

17. A non-transitory computer-readable storage medium, the computer-readable storage medium including instructions that when executed by a processor, cause the processor to:
generate a virtual object;
determine a virtual object collider for the virtual object;
determine a conic collider for the virtual object;
provide the virtual object to a user;
detect a landmark on the user's hand;
generate a landmark collider for the landmark; and
determine a user interaction with the virtual object by the user based on detecting a collision between the landmark collider with the conic collider and with the virtual object collider.

18. The computer-readable storage medium of claim 17 wherein an axis of the conic collider runs through a centroid of the virtual object.

19. The computer-readable storage medium of claim 17 wherein a point of the conic collider is at an eye position of the user.

20. The computer-readable storage medium of claim 17 wherein a radius of a base of the conic collider is equal to a radius of a sphere circumscribing the virtual object.

21. The computer-readable storage medium of claim 17 wherein a radius of a base of the conic collider is greater than a radius a sphere circumscribing the virtual object.

22. The computer-readable storage medium of claim 17 wherein the landmark is detected using one or more cameras.

* * * * *